(No Model.)

D. LUBIN.
CLOD CRUSHER.

No. 360,707. Patented Apr. 5, 1887.

Witnesses
T. Walter Fowler.
W. H. Patterson.

Inventor
David Lubin
By his Attorneys
A. H. Evans & Co.

UNITED STATES PATENT OFFICE.

DAVID LUBIN, OF SACRAMENTO, CALIFORNIA.

CLOD-CRUSHER.

SPECIFICATION forming part of Letters Patent No. 360,707, dated April 5, 1887.

Application filed December 8, 1886. Serial No. 221,011. (No model.)

*To all whom it may concern:*

Be it known that I, DAVID LUBIN, a citizen of the United States, residing at Sacramento, in the county of Sacramento and State of California, have invented certain new and useful Improvements in Clod-Crushers, of which the following is a full and clear description, reference being had to the accompanying drawings, forming part of this specification, in which—

Figure 1:
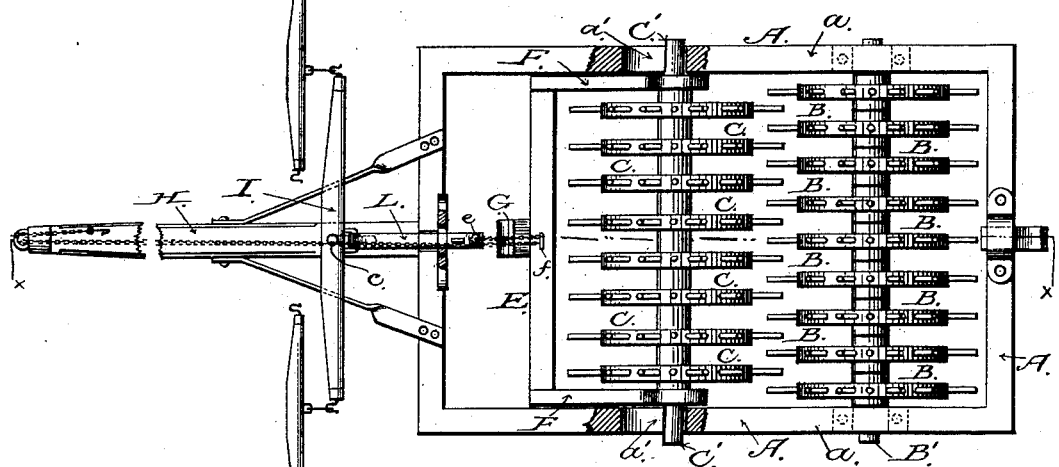
Figure 2:
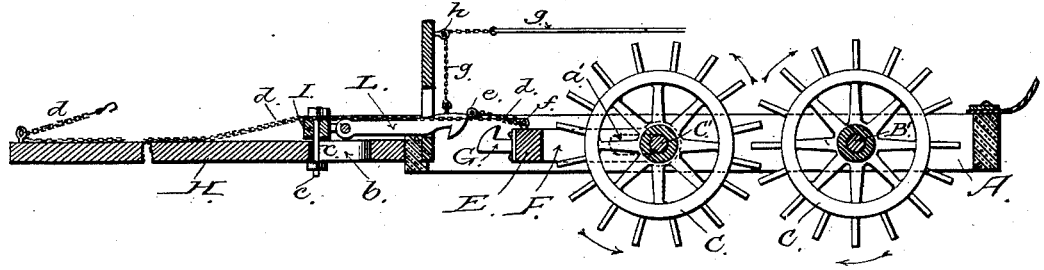
Figure 3:
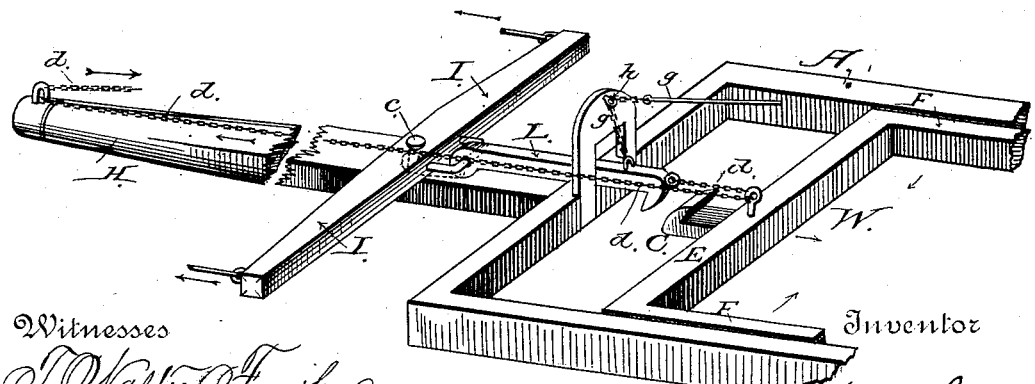

Figure 1 represents a plan view of a clod-crusher embodying my invention, the side beams of the main frame being broken away to show the slotted bearings for the shaft or axle C'. Fig. 2 is a sectional view of the same on the line X X of Fig. 1. Fig. 3 represents in detail a perspective of the front portion of the main frame, the pole and the sliding double-tree connected therewith, and also showing a preferred form of connection between said double-tree and the frame that carries the front series of wheels or disks.

My present invention relates to machines for crushing clods, the same being an improvement on certain of the features illustrated and described in my application filed November 30, 1886, Serial No. 220,225; and it consists in the construction and combination of devices which I shall hereinafter describe and claim.

To enable others skilled in the art to which my invention appertains to make and use it, I will now describe its construction and indicate a preferred manner in which the same is carried out.

In the said drawings, A represents a main frame, of any well-known construction, adapted to receive a plural number of cylinders or series of wheels or disks, such as B and C. These wheels or disks are provided with projecting teeth or spikes, which enter the ground and lift up and crush clods in a manner I will hereinafter disclose.

The wheels or disks B are mounted upon a transverse shaft, B', journaled or fixed in the side bars, a, of the main frame, and the wheels or disks C are mounted upon a transverse shaft, C', located, preferably, in front of the shaft B', whereby the teeth or spikes projecting from the series of wheels or disks B enter the space between the adjacent wheels or disks of the opposite series.

As both series of wheels or disks B and C rotate in the same direction, it is manifest the teeth or spikes on the wheels or disks of one series pass those on the wheels or disks of the opposite series in a reverse direction, the result of which movement of the double series of rotating wheels or disks is to cause the teeth or spikes to act with great power upon the clods of earth, and thereby crush the same as they are carried upward by said teeth.

One of the great drawbacks to many of the machines at present constructed is the absence of a positive mechanism for releasing an incompressible object which has been lodged between the teeth of the opposing series of wheels or disks. The speedy releasing of such an object is of prime importance, as the wheels or disks holding the obstruction become securely locked, in which condition they cease to revolve, but simply drag upon the ground, to the great detriment of the machine, as the opposing force of the obstructed wheels or disks tends to affect the teeth or spikes holding the object to such an extent that they will be broken off, thus impairing the successful working of the machine and necessitating the removal of the injured wheel or wheels. To overcome this difficulty and provide the machine with a simple yet a positive mechanism whereby the wheels or disks of one series may be moved away from those of the other series, thereby releasing the obstruction, is the object of my present invention. This object may be obtained in several ways. Therefore I do not wish to limit myself to any particular construction for accomplishing the purpose, although the means illustrated in the drawings may be considered a preferred manner of securing the necessary adjustments. These features embrace a construction which permits the shaft C', which carries the front series of wheels or disks to be moved forward from the rear series, thus increasing the space between the double series of wheels or disks, to permit the obstruction between the teeth or spikes of the locked wheels or disks to fall to the ground.

The shaft C' is loosely mounted in elongated slots a', formed in the sides of the main frame A, and is connected to a cross-bar, E, by arms F, as shown in Figs. 1 and 3, the said cross bars and arms joining a frame, W, which is provided with a projecting hook or catch, G, the purpose of which I will hereinafter make manifest.

The pole H of the machine is suitably braced and supported, and is provided with a slot, $b$, through which passes a bolt, $c$, the said bolt passing, also, through the double-tree I, to which suitable single-trees may be attached. By reason of this construction the double-tree is capable of a sliding movement on the pole, the purpose of which movement being hereinafter explained.

To the rear of the double-tree is pivotally connected a bar, L, having a hook-shaped end, which, when desired, couples with the hook or catch G, and thereby connects the double-tree directly with the frame W, carrying the front series of wheels or disks.

A cord, chain, or other connection, $d$, is attached by one end to an eye, $e$, on the end of the coupling hook or bar L, and, passing through a guide, $f$, on the cross-bar E, extends to the front of the pole, and after passing through a guide thereon has its opposite end attached to the harness of the team in any suitable manner.

The operation of the several parts before described, is substantially as follows: In the position shown in Fig. 1 the bolt $c$ is in the forward part of the slot $b$, and the draft is therefore upon the double-tree. In this position the double series of wheels or disks B and C are in operative connection, and lift up and crush between them the clods of earth. As soon as an incompressible object is lodged between the teeth or spikes of any of the wheels B and C the operator manipulates the driving-reins to back the team. During the backward movement of the same they draw upon the connection $d$, which in turn pulls upon the coupling-hook L to cause the latter to move backward and couple with the hook or catch G, before mentioned. When this is done, it will be found that bolt $c$ has traversed the length of the slot in the pole, so that when the team is again started forward the pull is upon the double-tree, and through its attached coupling-hook L to the frame in which the front series of wheels are attached. Therefore, as the team starts forward to its normal position, the shaft C′, with its series of wheels or disks, is moved forward independent of the rear series until said shaft reaches the forward end of the slots $a$ in the main frame. In this position the wheels are separated by a space sufficiently large to permit the obstruction to disengage itself or be easily dislodged by the operator. The wheels or disks remain in this adjusted position until the object is released, when the operator pulls upon a connection, $g$, fastened to the coupling-hook and passing through a guide, $h$, to the rear of the machine, and uncouples the hook L. By thus releasing the coupling devices it is manifest the forward movement of the team causes the shaft C′ and its wheels or disks (which are now disconnected with the draft) to automatically resume their normal position in the rear end of the slots $a'$.

From the foregoing description it is manifest the separation of the double series of teeth is a positive one, derived mainly from the movement of the team.

Having thus described my invention, what I claim as new, and desire to secure by Letters Patent, is—

1. The combination, with a series of rotary wheels or disks having teeth or spikes projecting therefrom, of a second series of spiked wheels rotating in close proximity to and in front of the first series, and a mechanism connecting the wheels of the front series with the team, whereby the movement of the latter adjusts the front series forward to dislodge an incompressible object, substantially as herein described.

2. In a clod-crusher, the shaft B′, having a series of spiked wheels or disks mounted thereon, in combination with the shaft C′, mounted in elongated slots in the main frame and having a series of wheels, C, a frame connected with said shaft, and a connection between the frame and team, whereby the backward movement of the latter draws the shaft C′ and series of wheels or disks C forward, substantially as herein described.

3. As means for releasing an incompressible object or obstruction lodged between the teeth of rotary wheels or disks, comprising a frame connected with and carrying one series of wheels or disks, a movable double-tree, an automatic coupling between said frame and double-tree, and a connection operated by the backward movement of the team to permit the members of the coupling to engage, substantially as herein described.

4. In a clod-crusher, the series of wheels or disks B, having teeth or spikes projecting therefrom, in combination with a main frame having elongated slots $a'$, a shaft, C′, journaled in said slots and carrying a series of wheels or disks, C, a frame, W, connected to said shaft, a movable whiffletree, coupling devices between the whiffletree and frame W, and a chain or equivalent device connected with one member of the coupling and front of the team, respectively, substantially as herein described.

5. In a clod-crusher, a main frame having a plural number of shafts, one of said shafts being mounted and adjusted in slotted bearings in said frame, and spiked wheels or disks on said shafts, in combination with a frame, W, attached to said movable shaft, a movable whiffletree, and coupling devices operated by the team for connecting the frame directly with the draft, whereby the forward movement of the team adjusts the movable shaft and wheels from the opposing series of wheels, substantially as herein described.

6. In a clod-crusher, a main frame having the slotted bearings $a'$, a shaft, B′, having a series of spiked wheels or disks, B, mounted thereon, a second shaft, C', journaled in the slotted bearings, having a series of spiked wheels and movable from the shaft B', in combination with a frame, W, connected to the shaft C' and having a catch or hook, G, a hooked bar, L, on the whiffletree engaging the hook G, a chain or connection between the hooked bar and front of the team, and a connection for releasing the coupling when desired, substantially as herein described.

DAVID LUBIN.

Witnesses:
JAMES S. STOKES,
M. LELESTO.